Figure 1:
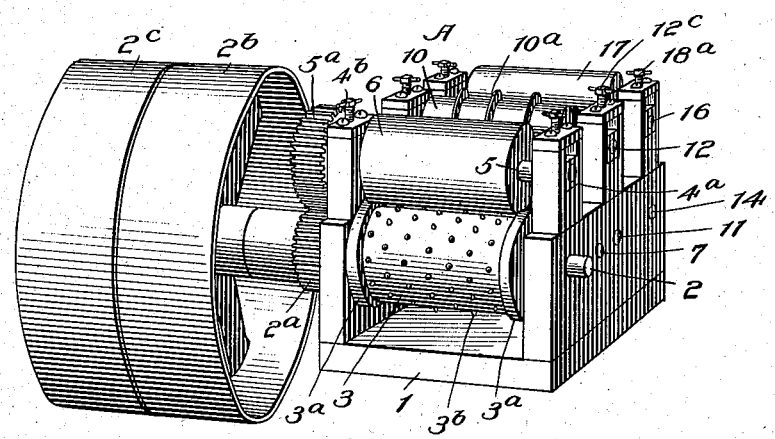

No. 866,946. PATENTED SEPT. 24, 1907.
J. F. MAGRUDER.
CANDY SPINNING MACHINE.
APPLICATION FILED MAY 22, 1907.

3 SHEETS—SHEET 1.

Witnesses
Edwin L. Bradford
John T. Schrott

Inventor
James F. Magruder.
By Fred G. Dieterich & Co
Attorneys.

No. 866,946. PATENTED SEPT. 24, 1907.
J. F. MAGRUDER.
CANDY SPINNING MACHINE.
APPLICATION FILED MAY 22, 1907.
3 SHEETS—SHEET 2.
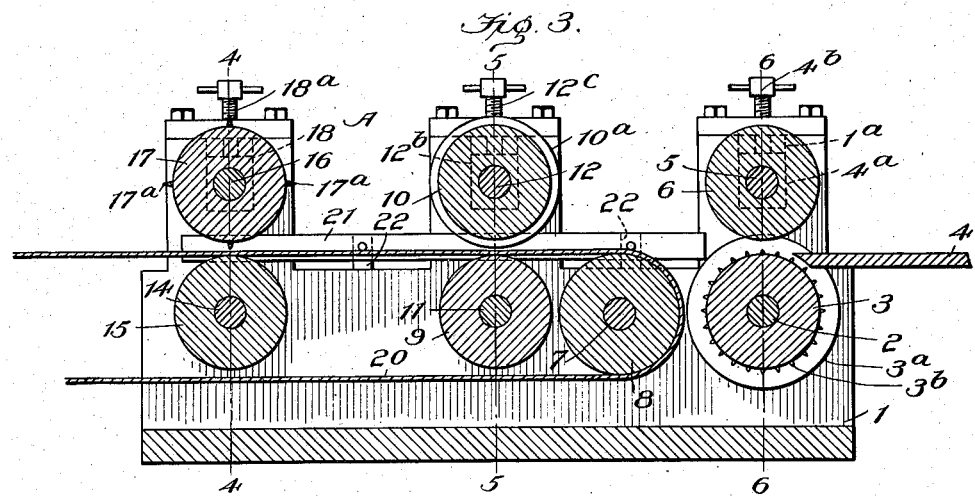
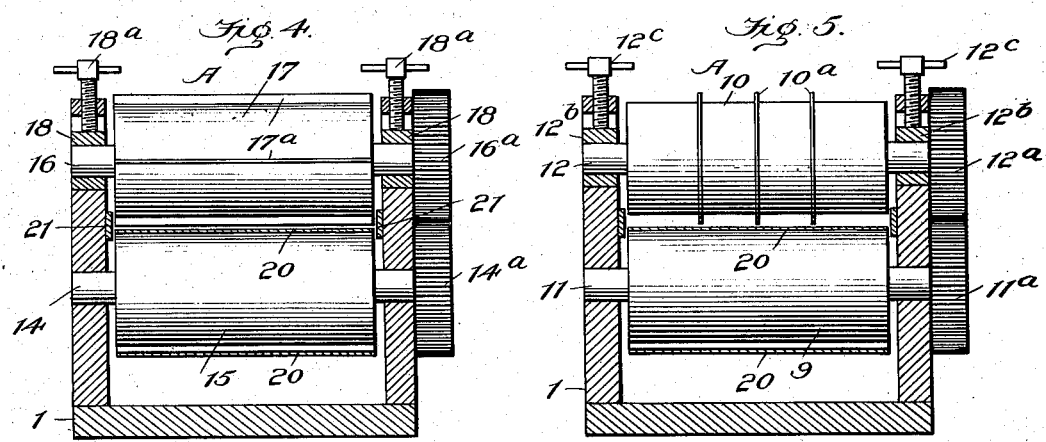
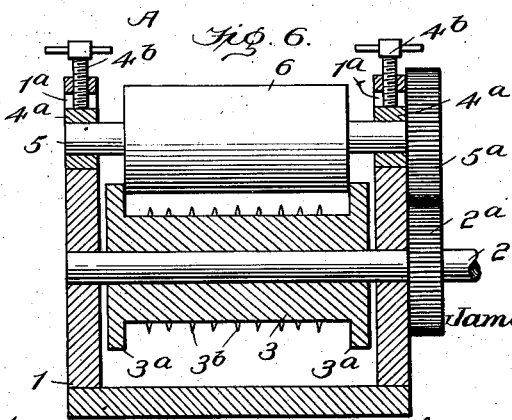
Witnesses
Edwin L. Bradford
John J. Schrott
Inventor
James F. Magruder.
By Fred G. Dieterich & Co.
Attorneys.

No. 866,946. PATENTED SEPT. 24, 1907.
J. F. MAGRUDER.
CANDY SPINNING MACHINE.
APPLICATION FILED MAY 22, 1907.
3 SHEETS—SHEET 3.
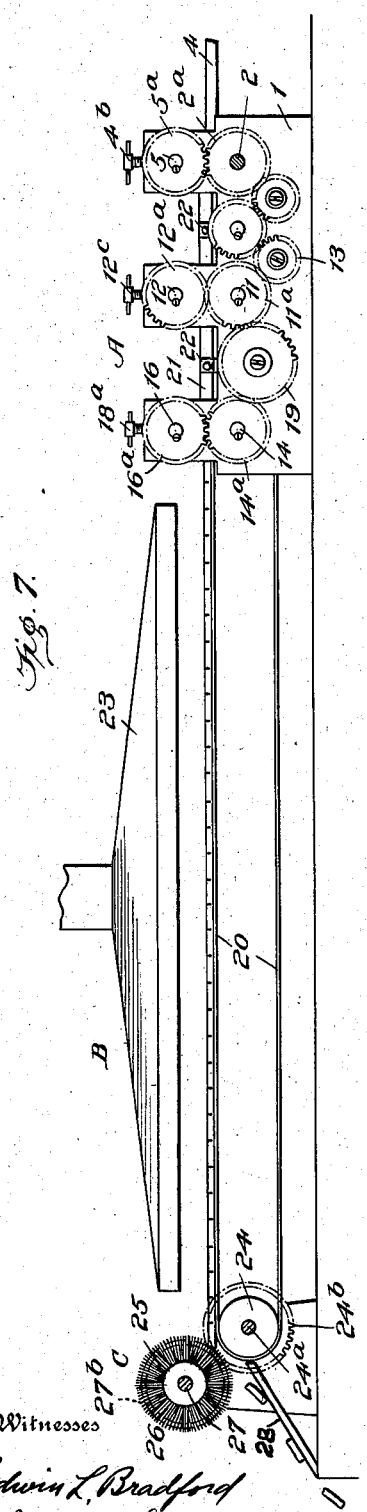
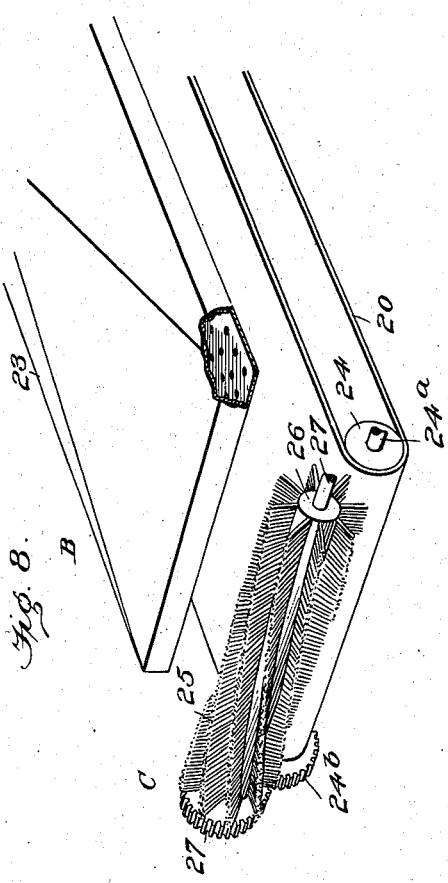
Witnesses
Edwin L. Bradford
John T. Schrott
Inventor
James F. Magruder.
By Fred G. Dieterich
Attorneys.

UNITED STATES PATENT OFFICE.

JAMES FREDERICK MAGRUDER, OF MEADVILLE, PENNSYLVANIA.

CANDY-SPINNING MACHINE.

No. 866,946.    Specification of Letters Patent.    Patented Sept. 24, 1907.

Application filed May 22, 1907. Serial No. 375,018.

*To all whom it may concern:*

Be it known that I, JAMES F. MAGRUDER, residing at Meadville, in the county of Crawford and State of Pennsylvania, have invented certain new and useful Improvements in Candy-Spinning Machines, of which the following is a specification.

My invention relates to certain new and useful improvements in candy spinning machines, and it particularly has for its object to provide a machine adapted to form the materials used in manufacturing hard-boiled candies, into flat strips of desired widths and lengths, such materials being previously mixed and prepared in the usual way.

My invention has particularly for its object to provide a machine for this purpose which is especially adapted for working the candy used as "centers" or inside portions of "chocolate chips" and the like. In such manufacturing, it is usually necessary to "spin" out the desired ribbon or strips from the warm, pliable batch by hand to as nearly correct thickness or widths as practicable in hands of expert candy spinners. This is a rather slow process, and hence my invention has also for its object to provide a machine of the type mentioned aforesaid in which the strips can be more quickly and uniformly cut and shaped to proper lengths and then cooled and broken apart to be ready to be dipped or coated with chocolate or any other coating in any desired and approved manner.

In its generic nature, the invention embodies a machine having a pair of receiving rollers which act not only as strip forming rollers, but also has feeding rollers for pulling the soft batch of material into the machine from a suitable support mounted in the front of the machine. From these rollers the strip is passed from a series of longitudinal cutting knives which provide the strips with cuts that do not entirely sever the sections of strips from one another, but leave a sufficient thickness of material to hold the strip as an entity. From these longitudinal cutters, the strip is passed through a transverse cutting mechanism which forms a transverse cut similar to the longitudinal cuts but not passing entirely through the material. From these cutting mechanisms the strip is fed onto an endless apron which carries the partially cut strips past a cooling blast where the strips are cooled and the material hardened. As the material reaches the limit of its movement over the endless belt it is acted upon by a rotary brush which breaks the strips from one another into the desired sections along the line of cut which has been produced by the longitudinal and transverse cutters, thus leaving the hardened material in proper size for forming the candy desired.

In its more subordinate nature, the invention also embodies certain novel details of construction, combination and arrangement of parts, all of which will be first described in detail, and then be specifically pointed out in the appended claims, reference being had to the accompanying drawings, in which,—

Figure 2:
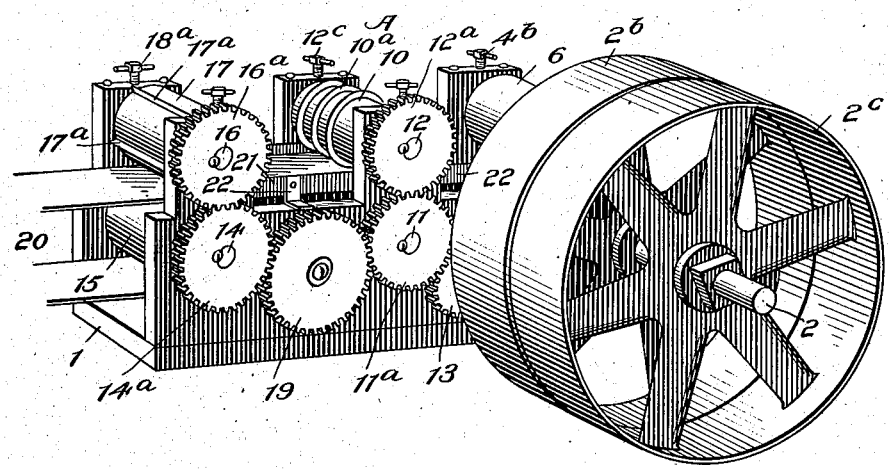

Figure 1, is a perspective view of the front or entrant end of my machine, the endless conveyer and cooling mechanism being omitted. Fig. 2, is a view similar to Fig. 1, of the side and rear of the cutting and rolling mechanism, the endless belt being partially shown. Fig. 3, is a central, vertical, longitudinal section of the parts shown in Fig. 2. Fig. 4, is a transverse section on the line 4—4 of Fig. 3, the rolls 17 and 15 being shown in elevation. Fig. 5, is a similar view on the line 5—5 of Fig. 3, the rolls 10 and 9 being shown in elevation. Fig. 6, is a similar view on the line 6—6 of Fig. 3, the rolls 6 and 3 being shown in elevation. Fig. 7, is a diagrammatic view of the entire apparatus in side elevation. Fig. 8, is an enlarged detail view of the rotary separating brush end of the apparatus, showing the manner in which the pieces are separated from the strip after passing through the cutting mechanism and through the cooling and hardening devices.

Referring now to the accompanying drawings in which like letters and numerals of reference indicate like parts in all of the figures, A designates the initial forming and cutting mechanism; B, the cooling and hardening mechanism and C, designates the separating or parting breaking mechanism.

Referring now more particularly to Figs. 1, 2, 3, 4, 5, and 6 of the drawings, it will be noticed that the initial forming and cutting mechanism A comprises a supporting frame 1 in which is journaled a main shaft 2 which carries a forming and feeding roller 3 that is provided with flanges $3^a$ at its ends and intermediate the flanges is provided with a series of short pins or teeth $3^b$, which serve to pull the soft batch from the bridge or guide table 4, as shown. Above the roller 3 the frame 1 is provided with bearing apertures $1^a$ in which a series of adjustable bearings $4^a$ are mounted, and these bearings $4^a$ are adjusted by a turn screw $4^b$ and also carry a shaft 5 upon which is mounted a presser roller 6 which coöperates with the roller 3 and is of such a length as to operate between the flanges $3^a$ of the roller 3, as clearly shown in Fig. 1, of the drawings. The shafts 2 and 5 are intergeared through the medium of the pinions $2^a$ and $5^a$ in such manner that when power is imparted to the shaft 2 through the medium of the pulley $2^b$, the rollers 3 and 6 will be rotated accordingly, it being understood, that a loose pulley $2^c$ may be provided on the shaft 2 for the usual purposes.

7 designates a shaft mounted in suitable bearings in a frame, which shaft 7 carries a roller 8 that is mounted in close proximity to the roller 3 and over which an endless belt 20 passes. This belt 20 will be referred to again later.

Mounted a suitable distance from the rollers 3 and 6 are rollers 9 and 10 whose shafts 11 and 12 respectively are mounted in a plane parallel to that containing the shafts 2 and 5. The roller 9 is of smooth face, while the roller 10 carries the rotary longitudinal cutting or parting knives 10ª which are spaced suitable intervals apart, depending upon the width of the strips to be cut. The shafts 11 and 12 are intergeared through pinions 11ª and 12ª respectively so as to rotate at about the same speed, it being understood that the shafts 2 and 5 are also rotating at about the same speed. The pinions 11ª and 2ª are also intergeared through an idler pinion 13 mounted on the side of the frame 1.

14 designates another shaft mounted in bearings in the frame 1 which carries a roller 15 similar to the roller 9 and which coöperates with the transverse cutting roller 17 that is mounted on the shaft 16 which is journaled in adjustable bearings 18 in the frame 1 of the machine, the bearings 18 being adjusted by adjusting screws 18ª, as indicated. The cutting roller 17 carries the horizontal cutting or parting knives 17ª which are adapted to cut the strip at right angles to the slitting knives 10ª hereinbefore referred to. The shafts 14 and 16, it should be stated, lie in a plane parallel to that containing the shafts 11 and 12, and the shaft 12 is mounted in adjustable bearings 12ᵇ in the frame 1 of the machine and adjusted by adjusting screws 12ᶜ, in a manner similar to the adjustments of the shafts 5 and 16. The endless belt 20 hereinbefore referred to, passes over the rollers 9 and 15 between the cutting rollers 10 and 17. The shafts 14 and 16 are intergeared through pinions 14ª and 16ª and the gears 14ª and 16ª are intergeared through the idler gear 19, as clearly shown in Fig. 2, of the drawings.

21 designates guards which are secured to the brackets 22 that are in turn secured to the frame 1 and the guards 21 coöperate with the flanges 3ª of the rollers 3 in keeping the batch of material in proper width and preventing its becoming tangled up while it is passing through the rolling and cutting mechanism.

The endless belt 20 passes under a blowing apparatus 23 which forms the cooling and hardening mechanism B hereinbefore referred to, and this air blast mechanism may consist of an elongated flat perforated tube, through which the air is forced by any approved blowing means (not shown). The cool air engaging the strip on the endless belt 20, serves to cool and harden the material so that as the material reaches the idler roller 24 around which the endless belt 20 passes, the material will be in a thoroughly hardened and cooled condition. At this point it is engaged by the rubber bristles 25 of the rotary brush 26 which is mounted on the shaft 27 that is intergeared with the shaft 24ª of the pulley 24 through the medium of the gears 24ᵇ and 27ᵇ, as shown, the rotary brush 26 being so arranged that its bristles will engage the strips just as they leave the belt pulley 24 and separate the cut pieces entirely from each other and allow them to enter the slideway 28 or other conveyer which delivers them to the dipping machine or wherever desired.

Briefly then, the operation of my invention is as follows: The operator feeds the batch of material between the rollers 3 and 6 by hand and as the material passes between these rollers it will be rolled out into the desired thickness or width and then passes onto the endless belt, and is conveyed through the longitudinal cutting mechanism and the transverse cutting mechanism which divides the strip into longitudinal and transverse sections, and as before stated, the cutters are so arranged as to not cut entirely through the strips, thus leaving the material as a substantially integral structure. From the cutting mechanism the strip is carried on the endless conveyer beneath the cooling mechanism B and from thence to the severing brush C, as before stated, where the sections are broken apart from one another by the rotary brush. It should be stated, that the endless conveyer is of a sufficient length to permit the material being cooled and hardened before being separated by the rotary severing mechanism C.

From the foregoing description taken in connection with the accompanying drawings it is thought the complete construction, operation and many advantages of my invention will be readily understood by those skilled in the art to which the invention appertains.

What I claim is:

1. An apparatus of the class described, combining strip forming and shaping rollers with longitudinal cutting rollers and transverse cutting rollers, said longitudinal and transverse cutting rollers arranged to partially cut the strip, together with an endless conveyer to receive the longitudinal and transversely cut strip, means for cooling said strip, and means for severing the cut sections after the strip has been coiled, substantially as shown and described.

2. In a machine of the class described, a supporting frame, a main drive shaft journaled in bearings in said frame, a flanged feed and shaping roller carried by said shaft, a supplemental shaping roller coöperating with said flanged shaping roller, held to occupy the space between and operable between the flanges thereof, means for intergearing said rollers, adjustable bearings for said second roller, means for longitudinally parting the strip as it passes from the shaping and feeding rollers, means for conveying the strip from the shaping and feeding rollers to said longitudinally parting means, means for transversely parting the strip after it leaves the longitudinally parting means, said conveying means arranged to convey the strip from said longitudinally parting means to said transversely parting means, and means for separating the parted sections of the strip substantially as shown and described.

3. In a machine of the class described, a supporting frame, a main drive shaft journaled in bearings in said frame, a flanged feed and shaping roller carried by said shaft, a supplemental shaping roller coöperating with said flanged shaping roller and operable between the flanges thereof, means for intergearing said rollers, adjustable bearings for said second roller, means for longitudinally dividing the strip as it passes from the shaping and feeding rollers, means for conveying the strip from the feeding and shaping rollers to said longitudinally parting means, means for transversely parting the strip after it leaves the longitudinally parting means, said conveying means arranged to convey the strip from said longitudinally parting means to said transversely parting means, said longitudinally parting means including a smooth surfaced roller and a superimposed roller having parting blades, adjustable bearings for the shaft of said superimposed roller, a cooling means, said conveying means passing under said cooling means and consisting of an endless conveyer belt, and pulleys around which said conveyer belt passes.

4. In a machine of the class described, a supporting frame, a main drive shaft journaled in bearings in said frame, a flanged feed and shaping roller carried by said shaft, a supplemental shaping roller coöperating with said flanged shaping roller and operable between the flanges thereof, means for intergearing said rollers, adjustable bearings for said second roller, means for longitudinally dividing the strip as it passes from the shaping and feeding rollers, means for conveying the strip from the shaping and feeding rollers to said longitudinally parting means, means for transversely parting the strip after it leaves the longitudinally parting means, said conveying means arranged to convey the strip from said longitudinally parting means to said transversely parting means, said longitudinally parting means including a smooth surfaced roller and a superimposed roller having parting blades, adjustable bearings for the shaft of said superimposed roller cooling means, said conveying means projected under said cooling means, and consisting of an endless conveyer belt, pulleys around which said conveyer belt passes, and a rotary separating brush coöperating with said conveying means for separating the cooled partially severed sections of the strip from one another after being cooled.

5. A machine of the class described, comprising in combination with a pair of superimposed feeding and shaping rollers, a supporting frame therefor, a pair of superimposed longitudinally parting rollers mounted in said supporting frame, one of said rollers having longitudinal parting knives, and transversely parting rollers mounted in said frame, means for intergearing all of said rollers, an idler roller mounted between the shaping and feeding rollers and the cutting rollers, and endless belt passing around said idler roller, and through said cutting rollers, a second roller around which said endless belt also takes, said first mentioned endless belt roller being mounted in said frame and one of said feed rollers having teeth or pins, a cooling means held adjacent said endless belt under which the longitudinally and transversely parted strip must pass, and means for severing the strip into its various parts after being cooled.

6. A machine of the class described, comprising in combination with a pair of superimposed feeding and shaping rollers, a supporting frame therefor, a pair of superimposed longitudinally parting rollers mounted in said supporting frame, one of said rollers having longitudinally parting knives, and transversely parting rollers mounted in said frame, means for intergearing all of said rollers, an idler roller mounted between the shaping and feeding rollers and the cutting rollers, and endless belt passing around said idler roller, and through said cutting rollers, a second roller around which said endless belt also takes, said first mentioned endless belt roller being mounted in said frame, and one of said feeding rollers having teeth or pins, a cooling means held adjacent said endless belt under which the longitudinally and transversely parted strip must pass, means for severing the strip into its various parts after being cooled, said last named means comprising a rotary separating brush adapted to engage said strip as it leaves the endless conveyer substantially as shown and described.

7. The combination with the feed and forming rollers, the longitudinally parting rollers and the transverse parting rollers, of a cooling means and a strip section separating means, substantially as shown and described.

8. The combination with the successively arranged feeding and forming rollers, longitudinal parting rollers and transverse parting rollers, a cooling means and a strip section separating means, of means for conveying the material through said rollers and to said cooling and separating means, substantially as shown and described.

JAMES FREDERICK MAGRUDER.

Witnesses:
H. C. BEMAN,
H. P. WHITE.